Patented Dec. 1, 1936

2,062,370

UNITED STATES PATENT OFFICE 2,062,370

CARBON COATED OBJECTS AND METHOD OF MAKING THE SAME

Henry J. Miller, Maplewood, N. J., assignor to Radio Corporation of America, a corporation of Delaware No Drawing. Application May 18, 1934, Serial No. 726,291

9 Claims. (Cl. 250—27.5)

My invention relates to carbon coated objects, more particularly to carbon electrodes used in electron discharge devices and having a coating of pure micro crystalline carbon and to the method of making such electrodes.

The use of carbon electrodes, particularly anodes, in electron discharge devices of the high vacuum type, is very desirable because of the high thermal emissivity of the carbon resulting in lower operating temperatures, the more uniform tube characteristics and the longer life which such an electrode has over the usual nickel or molybdenum electrodes. The use of such electrodes however, has not been entirely successful because of the presence of amorphous carbon, loose particles of crystalline carbon, hydro carbons and other solid carbon compounds on the surface of the carbon electrodes and because of the high gas content which such electrodes have. The amorphous carbon makes it difficult to degasify the electrodes during exhaust since it reacts at high temperatures with the residual gases in the tube and results in a coating which is deposited upon the cathode and other parts of the tube during and after exhaust, interfering with the proper heating and electron emission of the cathode. The loose particles of crystalline carbon seem to acquire an electrical charge during the operation of the tube, become dislodged from the anode and scattered over the interior of the tube, some of them colliding with and attaching themselves to the cathode, thereby further interfering with its emission. Some of the improperly bound carbon can be sputtered from the plate by heat generated during the operation of the tube and thus interfere with proper operation of the tube.

It is, therefore, an object of my invention to provide properly bonded crystalline carbon electrodes for use in electron discharge devices and having a coating and bonding of pure microcrystalline carbon, and a novel and inexpensive method of making such electrodes.

In accordance with my invention I first remove from the surface of the crystalline carbon electrode to which the coating is to be applied, all contaminations, amorphous carbon and very small loose particles of crystalline carbon by heating the electrode to be coated to high temperatures in the presence of certain inert gases containing some oxygen or by treating in a chemical bath or the combination of the two. The clean surface of the electrode is then bonded with microcrystalline carbon by laying down this microcrystalline carbon as a layer or coating, this coating being applied by heating the electrode to high temperatures in the presence of either cyclic or aliphatic hydrocarbons saturated or unsaturated.

More specifically, the loose amorphous carbon, small particles of crystalline carbon and other contaminating materials are removed from the surface of the crystalline carbon electrode to be coated by heating the electrode for about ten minutes at a temperature of from 900° C. to 1400° C., the most desirable temperature being about 1300° C., while passing a current of nitrogen gas containing from about 3% to a maximum of 10% of oxygen by volume, or while passing carbon dioxide over the anode being treated. The nitrogen or carbon dioxide is preferably saturated with water vapor at room temperatures, for example, by bubbling thru water bottles.

When treated with nitrogen and oxygen the oxygen will combine with the loose amorphous carbon and the very small particles of crystalline carbon to form carbon monoxide and will go off as a gas. When treated with carbon dioxide, carbon monoxide is formed. In both cases the water vapor combines with the amorphous carbon and very small particles of crystalline carbon to form carbon monoxide and hydrogen both of these products going off as gases. Neither oxygen nor carbon dioxide will combine with the crystalline carbon base within the suggested range of temperature. If large amounts of hydrocarbons are present on the surface of the electrode to be treated they may be removed by washing the electrode in a bath of selenium oxydichloride, which combines with the hydrocarbons, and then washing the electrode with water. This selenium oxydichloride bath may be used alone or in combination with the heat treatment described above to clean the electrode, the selenium oxy-dichloride bath being desirable if the electrodes are given a heat treatment at low temperatures. The above treatment provides a clean surface of crystalline carbon which, however, is pitted or porous.

After having cleaned the electrode surface the coating of microcrystalline carbon is then applied to provide a nonporous surface which will not absorb gas and which will not sputter in operation in a vacuum tube. This may be done by using gases containing cyclic hydrocarbons or gases containing aliphatic hydrocarbons alone or mixed with other gases and containing water vapor.

When treated with gases containing cyclic hydrocarbons the electrodes are heated from one to ten minutes at a temperature of from 650° C. to 1400° C., a temperature of about 1300° C. being the best, the higher temperature producing a coating having a higher electrical conductivity. Examples of gases which can be used and which contain cyclic hydrocarbons are—(a) illuminating gas (coal gas), (b) illuminating gas or hydrogen each saturated with benzine, (c) illuminating gas or hydrogen each saturated with chloroform, or (d) illuminating gas or hydrogen each saturated with carbon tetrachloride. The illuminating gas or hydrogen is bubbled thru the benzine, the chloroform or the carbon tetrachloride to provide the saturated gas. One example of illuminating gas used comprised mixture of hydrogen about 41%, methane about 44% and small amounts of illuminants, carbonic acid, carbonic oxide and nitrogen comprising the remainder. This treatment will result in deposition on the surface of the electrode of a very hard and pure microcrystalline carbon (bright carbon) deposit which does not readily absorb gas and which is free from amorphous carbon or loose crystalline particles of carbon.

While gases containing cyclic hydrocarbons can be used to obtain the microcrystalline coating, I have found the process difficult to control and have obtained better results by using gases containing aliphatic hydrocarbons for laying down the microcrystalline carbon coating. In using this latter group of gases the carbon electrodes, after being cleaned as described above, are heated for from about one to ten minutes at a temperature of from 800° C. to 1500° C., a temperature of 1300° C. being the best, in the presence of (a) natural gas containing for example, approximately 65% of methane and 34% ethane, (b) natural gas saturated with water vapor at room temperature, (c) pure methane, (d) a mixture of methane from 1–10% by volume diluted with nitrogen from 99% to 90% by volume, the nitrogen containing small amounts, not more than 3% of oxygen, (e) methane 1% to 10% by volume combined with carbon dioxide from 99% to 90% by volume, (f) nitrogen containing about 3% oxygen saturated with benzine at room temperature, (g) carbon dioxide saturated with benzine at room temperature, (h) carbon monoxide saturated with benzine at room temperature. When bubbled thru benzine it seems to be desirable to bubble at the rate of from 2 to 20 bubbles per second. Water vapor is introduced into the gases by first bubbling the gases thru water bottles, in all cases except the first, (a). This water vapor acts to oxidize any chance amorphous carbon still present on the surface of the electrode after cleaning.

The coating appears under the microscope to be composed of microcrystalline individual particles with random orientation, the coating being nonporous and approaching the hardness of diamond.

While a carbon electrode having a coating of microcrystalline carbon may be made by using any of the gases mentioned above, the preferred treatment and the one which seems to give the most desirable results is described below.

A number of carbon electrodes are placed in a suitable container, such as, the commonly used molybdenum boats and placed in a furnace having a hydrogen atmosphere, such as commonly used for firing metal parts for radio tubes to clean the surfaces of these parts. Instead of the hydrogen gas however, carbon dioxide saturated with water vapor may be used, the carbon dioxide being preferably bubbled thru water bottles before being introduced into the furnace. The carbon dioxide will react with the loose amorphous type of carbon and the very small loose particles of crystalline carbon usually present on the surface of the graphite electrodes and will oxidize this carbon to form carbon monoxide gas, which is liberated in the furnace. The water vapor also reacts with the amorphous carbon and very small loose particles of crystalline carbon to form carbon monoxide gas and hydrogen gas, which are also liberated in the furnace. Other contaminations are also oxidized during this heating process. The electrodes are heated in this oxidizing atmosphere for about ten minutes at a temperature of 1300° C. after which they are removed from the furnace. This heat treatment may be sufficient to eliminate the amorphous carbon contaminations and loose particles of crystalline carbon. It may be desirable however, to insure a clean surface by washing the electrodes in a bath of selenium oxy-dichloride and subsequently dipping them in water to wash off the selenium oxy-dichloride. After the electrodes have been treated to remove all contaminations and loose carbon, the surfaces of the electrodes are left clean but somewhat pitted or porous. The second step in the process is intended to level off the surface of the carbon electrode and to provide a coating of hard microcrystalline carbon (bright carbon) which does not absorb gas and which will not sputter during operation, for example, in a vacuum tube.

The electrodes are again placed in the furnace, the atmosphere in the furnace preferably comprising carbon dioxide saturated with benzine at room temperature, the carbon dioxide containing water vapor which is added by first bubbling the carbon dioxide gas thru water bottles. The electrodes are fired in this atmosphere for about ten minutes at 1300° C. and after removal are ready for use in vacuum type electron discharge tubes.

By treating a carbon electrode in the manner described a carbon coating will result which has a microcrystalline structure which fills up the voids in the surface of the graphite anode produced by the cleaning step and which bonds the surface of the anode with a coating which approaches the hardness of diamond and which does not absorb gas.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is,—

1. The method of producing a coating of pure microcrystalline carbon on a carbon base which comprises subjecting the carbon base to temperatures of from 900° to 1400° C. in an atmosphere of gas containing some oxygen to clean the base and then heating the carbon base at from 800° to 1500° C. in an atmosphere of gas containing aliphatic hydrocarbons and saturated with water vapor.

2. The method of applying a coating of pure microcrystalline carbon to a carbon base which comprises subjecting the carbon base to temperatures of from 900° C. to 1400° C. in an atmosphere of gas containing some oxygen, said atmosphere being saturated with water vapor, and then heating the carbon base at from 800° C. to 1500° C. in an atmosphere of gas containing aliphatic hydrocarbons and saturated with water vapor.

3. The method of applying a coating of pure microcrystalline carbon to a carbon base comprising subjecting the carbon base to a temperature of 1300° C. for about ten minutes in an atmosphere of carbon dioxide saturated with water vapor and then heating the carbon base at from 800° C. to 1500° C. for about ten minutes in an atmosphere of gas containing aliphatic hydrocarbons and saturated with water vapor.

4. The method of treating a carbon base which comprises cleaning the carbon base by subjecting it to a temperature of about 1300° C. in an atmosphere of gas saturated with water vapor and containing some oxygen and then heating the cleaned carbon base to a temperature of 1300° C. in an atmosphere containing aliphatic hydrocarbons saturated with water vapor to produce in said cleaned carbon base a dense coherent coating of pure microcrystalline carbon.

5. The method of applying a coating of pure microcrystalline carbon to a carbon base which comprises subjecting the carbon base to a temperature of substantially 1300° C. for about ten minutes in an atmosphere of gas containing an oxidizing medium, said gas being saturated with water vapor to clean the surface of the carbon and then subjecting the carbon base to a temperature of 1300° C. for about ten minutes in an atmosphere of water saturated gas comprising a mixture of methane and carbon dioxide, the methane comprising from 1% to 10% of the mixture by volume.

6. The method of applying a coating of pure microcrystalline carbon to a carbon base which comprises subjecting the carbon base to a temperature of 1300° C. for about ten minutes in an atmosphere of inert gas containing oxygen and saturated with water vapor to clean the surface of the carbon base and then subjecting the carbon base to a temperature of 1300° C. in an atmosphere of gas comprising carbon dioxide saturated with water vapor and benzine at room temperature.

7. The method of applying a coating of pure microcrystalline carbon to a carbon base which comprises subjecting the carbon base to a temperature of substantially 1300° C. for about ten minutes in an atmosphere of carbon dioxide saturated with water vapor and then subjecting the carbon base to a temperature of 1300° C. for about ten minutes in an atmosphere of gas comprising a mixture of methane and carbon dioxide, the methane comprising from 1% to 10% of the mixture by volume, said gas being saturated with water vapor.

8. An electrode comprising a carbon base and a closely adherent coating of hard microcrystalline carbon adjacent said carbon base and free of loose amorphous carbon or particles of crystalline carbon between said base and coating, said coating having a hardness approaching that of a diamond.

9. An electrode comprising a carbon base and a closely adherent non-porous coating of pure hard microcrystalline carbon particles with random orientation, said coating having a hardness approaching that of a diamond.

HENRY J. MILLER.